United States Patent

Smith

[15] 3,663,843
[45] May 16, 1972

[54] HALL EFFECT TRANSDUCER

[72] Inventor: David L. Smith, Hampton, Va.

[73] Assignee: The United States of America as represented by the administrator of the National Aeronautics and Space Administration

[22] Filed: Mar. 19, 1971

[21] Appl. No.: 125,979

[52] U.S. Cl. ................................................310/10, 310/15
[51] Int. Cl. ..........................................................H01c 7/16
[58] Field of Search ..................310/10, 15; 324/45; 338/89; 323/94 H

[56] References Cited

UNITED STATES PATENTS

| | | | |
|---|---|---|---|
| 3,184,620 | 5/1965 | Leibowitz et al. | 310/10 X |
| 3,365,594 | 1/1968 | Davidson, Jr. | 310/10 |
| 2,725,504 | 11/1955 | Dunlap, Jr. | 323/94 H X |
| 3,192,471 | 6/1965 | Kuhrt et al. | 323/94 H X |

*Primary Examiner*—D. X. Sliney
*Attorney*—John R. Manning, Howard J. Osborn and William H. King

[57] ABSTRACT

A Hall effect transducer that produces output voltages directly proportional to rotary shaft displacements. The linearity of this transducer is extended to a range of input shaft rotation up to ±50° by means of a special Hall probe.

7 Claims, 2 Drawing Figures

Patented May 16, 1972

3,663,843

INVENTOR.
DAVID L. SMITH
BY Howard J. Osborn
William H. King
ATTORNEYS

HALL EFFECT TRANSDUCER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to a device for converting mechanical rotations to electrical signals and more specifically concerns a Hall effect transducer that uses a special Hall probe to extend the linear output range of the transducer.

There is a need for a Hall effect transducer that will produce output voltages directly proportional to rotary shaft displacements, such as for mechanical differential pressure meters. Such a transducer would not introduce frictional contact between stationary and moving parts; and, as in the case of other mechanical-to-electrical transducers, the output of the transducer could be readily transmitted to any desired location for display, storage, or computer processing. Also, inasmuch as the sine of an angle and its measure in radians are approximately equal for small angles, a Hall effect transducer will inherently produce an electrical output directly proportional to its rotation input for inputs up to ±6°. It is desirable that this range of linearity be extended. Therefore, it is the primary purpose of this invention to provide a mechanical-to-electrical Hall effect transducer with an extended range of linearity.

SUMMARY OF THE INVENTION

The invention consists of a Hall effect mechanical-to-electrical transducer. Generally, the electrical output would be proportional to the sine of the angle of rotation of the input shaft. Since the sine of an angle is approximately equal to the angle for small angles there is an inherent linear relationship between input and output for angles of up to ±6°. The transducer that constitutes this invention extends this linear range up to ±50° by use of a special type Hall probe. This special type probe is one that utilizes a ferrite concentrator.

DETAILED DESCRIPTION OF THE INVENTION

Figure 1:
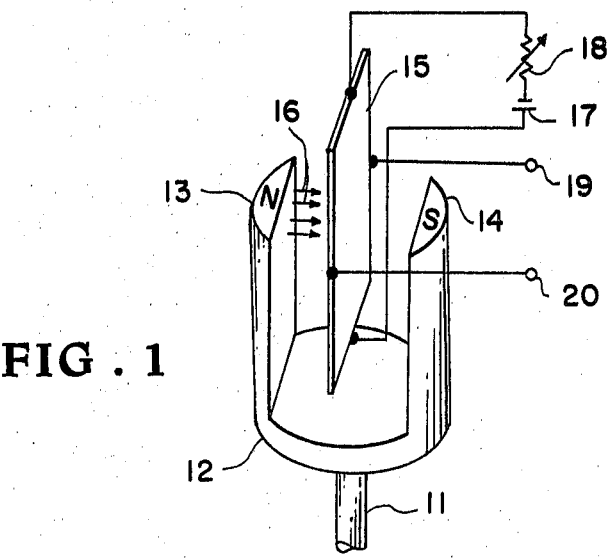
FIG. 1 is a schematic drawing of the invention.

Turning now to the embodiment of the invention selected for illustration in the drawings, the number 11 in FIG. 1 designates an input shaft. This input shaft will turn in either direction and is adapted to be coupled to any shaft, such as the output shaft of a meter. A permanent magnet 12 having a north pole 13 and a south pole 14 is coupled to shaft 11. A Hall probe 15 is rigidly suspended between the poles of permanent magnet 12 such that when shaft 11 is in its initial position (no input-to-input shaft 11) the magnetic flux lines 16 of the magnetic field are parallel to the plane of Hall probe. The strength of the magnetic field around probe 15 is between 800 and 1000 gauss. A power source 17 and a variable resistor 18 are connected in series between contacts at the ends of Hall probe 15 to supply a constant control current to the probe. Output terminals 19 and 20 are connected to contacts at the sides of the probe to receive the output voltage generated between the contacts.

In the operation of the transducer disclosed in FIG. 1, with a constant current being applied to the contacts at the ends of probe 15 by source 17, and with the plane of probe 15 being parallel to flux lines 16 the voltage across output terminal 19 and 20 is zero. Now assume that the shaft 11 is turned through an angle of $\theta$ in either direction, then the output voltage across terminals 19 and 20 is proportional to sine $\theta$. Inasmuch as sine $\theta$ is approximately equal to the value of $\theta$ in radians as long as $\theta$ is within the range of ±6°, there exists a linear relationship between input shaft rotation and output voltage for the device in FIG. 1. If $\theta$ becomes larger than ±6° this linear relationship no longer exists. The inventor has found that by using a special Hall probe as probe 15 the range of the linear relationship between input shaft rotation and output voltage can be extended to ±50°. This special Hall probe is disclosed in FIG. 2.

Figure 2:
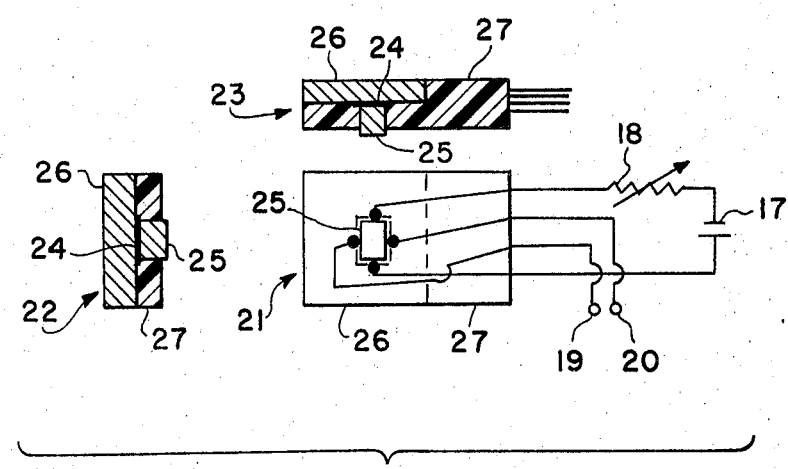
FIG. 2 is a special Hall probe used in the embodiment of the invention disclosed in FIG. 1.

Referring now to FIG. 2, THE NUMBERS 21, 22 and 23 designate plane, side and top views, respectively, of a Hall probe that is used in this invention. The substrate 24, which is indium arsenide in this probe, is sandwiched between two rectangular ferrite pieces 25 and 26. The smaller rectangular ferrite piece 25 is called a concentrator as it tends to gather all the magnetic flux lines entering the larger ferrite piece 26. The substrate 24 is very near the same size as the face of the smaller ferrite piece 25 which is against it; therefore, substrate 24 is acted on by all the magnetic flux lines passing through the ferrite concentrator 25. The probe is encapsulated in a suitable material 27.

The Hall effect is generated in the substrate 24. The constant current supplied by source 17 and variable resistor 18 is applied to contacts at the ends of substrate 24. The output of the probe is across terminals 19 and 20 which are connected to contacts at the sides of substrate 24.

The linear output or variation with a change in the angle between the Hall probe in FIG. 2 and the magnetic flux lines is believed to be related to the magnetic saturation of the ferrite concentrator 25, but a complete explanation is not known at present.

The advantage of this invention is that it provides a mechanical-to-electrical transducer with no frictional contact between stationary and moving parts and with an extended range of linearity between input and output of the transducer.

It is to be understood that the form of the invention herewith shown and described is to be taken as a preferred embodiment. Various changes may be made without departing from the spirit or scope of the invention as defined in the subjoined claims. For example, the magnet could be an electrical magnet instead of a permanent magnet and the probe could be made to be the rotating element instead of the magnet.

What is claimed as new and desired to be secured by Letters Patent of the United States is:

1. A Hall effect mechanical-to-electrical transducer that produces an electrical output proportional to a shaft rotation comprising: a magnet; a Hall probe including a flux concentrator located in the magnetic field of said magnet; means for supplying a constant current to said Hall probe; output terminals connected to said Hall probe; and shaft means for changing the position of said Hall probe relative to said magnetic field whereby when the plane of said probe is parallel to the lines of flux in said magnetic field there is zero voltage across said output terminals and when the plane of said probe makes an angle within the range of ±50° with said lines of flux the voltage across said output terminals is directly proportional to said angle.

2. A Hall effect mechanical-to-electrical transducer as claimed in claim 1 wherein said flux concentrator is a ferrite flux concentrator.

3. A Hall effect mechanical-to-electrical transducer as claimed in claim 1 wherein the strength of the magnetic field produced around said probe is between 800 and 1,000 gauss.

4. A Hall effect mechanical-to-electrical transducer as claimed in claim 1 wherein said Hall probe comprises: a first ferrite piece; a second ferrite piece smaller than said first piece; and a substrate sandwiched between said first and second ferrite pieces.

5. A Hall effect mechanical-to-electrical transducer as claimed in claim 4 wherein said substrate is about the same size as the face of said second ferrite piece.

6. A Hall effect mechanical-to-electrical transducer as claimed in claim 5 wherein said constant current is supplied to contacts at opposite sides of said substrate and said output terminals are connected to contacts at opposite ends of said substrate.

7. A Hall effect mechanical-to-electrical transducer as claimed in claim 6 wherein said substrate is made from indium arsenide.

* * * * *